J. H. BRIDGINS.
ICE PICK.
No. 66,557.
Patented July 9, 1867.
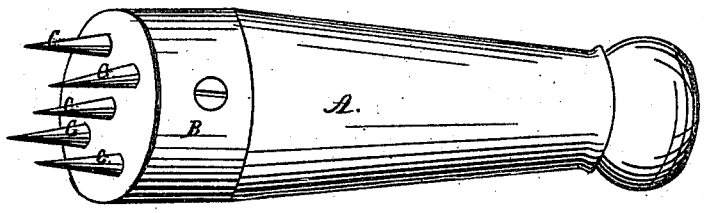
Attest:
Inventor:

United States Patent Office.

JAMES H. BRIDGINS, OF ASTORIA, NEW YORK.

Letters Patent No. 66,557, dated July 9, 1867.

IMPROVED ICE-PICK.

*The Schedule referred to in these Letters Patent and making part of the same.*

TO ALL WHOM IT MAY CONCERN:

Be it known that I, JAMES H. BRIDGINS, of Astoria, Queens county, New York, have invented a new and improved Ice-Pick; and I do hereby declare that the following is a full, clear, and exact description thereof which will enable others skilled in the art to make and use the same, reference being had to the accompanying drawings, forming part of this specification.

The present invention relates to a pick more especially intended for the breaking up of ice into small particles suitable for use in freezers for ice-cream and other purposes where desirable.

This pick is formed or made with a suitable handle or holder provided at one end with a series of sharp-pointed and elongated prongs or teeth, so that when brought against the ice it will cut or break up the same in several lines at once, and consequently into small particles, the size of which will depend in a great measure upon the relative distances apart of the several prongs to the pick. In the accompanying plate of drawings my improved ice-pick is illustrated, the figure being a perspective view of the same.

A, in the drawings, represents the handle or holder to the pick, which handle may be made of wood, metal, or of any other suitable material and of any proper shape, length, and size for convenience of use and handling. B, a ferrule or head secured to one end of handle A in any proper manner. This head B is provided with a series of elongated prongs or teeth, C, that at their outer ends D are sharpened or pointed so as to enter the ice when brought into contact with it. By the series of prongs C ice can be broken up into small particles, as each prong serves its purpose and separates the ice at the point where it impinges; the several prongs greatly facilitating the breaking up of the ice, and each helping the other in its work.

Having thus described my invention, what I claim as new, and desire to secure by Letters Patent, is—

An improved ice-pick made with a suitable handle or holder provided with a series of prongs or picks, substantially as described.

JAMES H. BRIDGINS.

Witnesses:
   WM. F. McNAMARA,
   ALEX. F. ROBERTS.